UNITED STATES PATENT OFFICE.

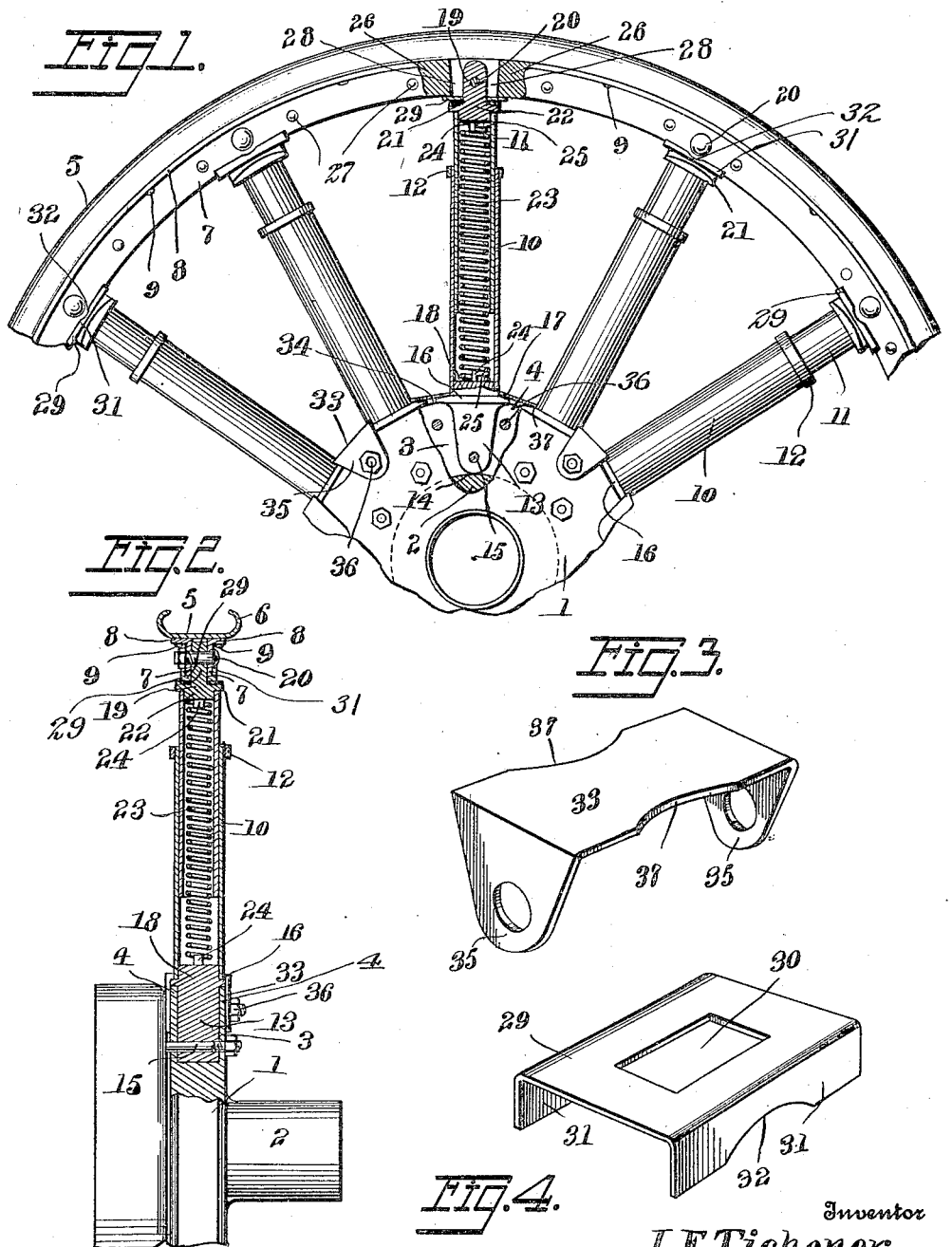

LEWIS E. TICHENOR, OF DETROIT, MICHIGAN, ASSIGNOR TO TICHENOR SPRING WHEEL COMPANY, OF SARATOGA, WYOMING.

SPRING-WHEEL.

1,124,077. Specification of Letters Patent. Patented Jan. 5, 1915.

Application filed April 10, 1914. Serial No. 831,014.

*To all whom it may concern:*

Be it known that I, LEWIS E. TICHENOR, a citizen of the United States, residing at Detroit, in the county of Wayne and State of Michigan, have invented new and useful Improvements in Spring-Wheels, of which the following is a specification.

This invention relates to spring wheels the object in view being to produce a simple, economical and practical wheel of the class described upon which the use of a pneumatic tire is rendered unnecessary, the road shocks being taken up by the wheel itself and between the hub and rim or felly thereof.

With the above and other objects in view, the invention consists in the novel construction, combination and arrangement of parts, as will be hereinafter more fully described, illustrated and claimed.

In the accompanying drawings:—Figure 1 is a side elevation partly in section of a portion of a vehicle wheel illustrating the present invention. Fig. 2 is a cross section through the same. Fig. 3 is a detail perspective view of one of the mud guards used on the inner end of each spoke. Fig. 4 is a detail perspective view of one of the mud guards used on the outer end of each spoke.

Referring to the drawings 1 designates the hub of the wheel which for the purpose of carrying out the present invention is provided with a cylindrical extension 2 formed in the periphery thereof with an annular channel 3 in which the inner spoke ends are received as shown, the channel 3 forming oppositely arranged flanges 4 located in spaced relation to each other and through which the bolts hereinafter described are inserted.

5 designates the rim or felly which is illustrated as provided with the usual tire holding flanges 6. This rim has fastened rigidly to the inner face thereof parallel annular angle irons 7 arranged in spaced relation to each other and provided along their outer edges with flanges 8 which are bolted or riveted to the rim 5 as shown at 9.

The hub and rim or felly are connected together in concentric relation by means of a circular series of spokes each of which comprises a pair of tubular casings 10 and 11, the casing 10 being of sufficient diameter to slidingly receive within the same the other tubular casing 11 and the casing 10 being reinforced at its extremity by a band 12 permanently secured in fixed relation thereto.

Each spoke is provided at its inner extremity with a coupling end 13 the extreme inner portion of which is rounded at 14 and held pivotally within the channel 3 of the hub extension 2 by means of a pivot bolt 15 which passes through the flanges 4. This enables the inner end of the spoke to rock or turn relatively to the hub. Each coupling end 13 is provided with laterally extending flanges forming shoes 16 which fit loosely into the position shown and at opposite sides these shoes are extended to form oppositely projecting lips 17 the purpose of which will appear. Each coupling end also comprises a boss 18 extending outwardly from the part on which the shoes 16 are formed, the boss 18 being of just sufficient size to fit within and receive the adjacent end of the casing 10 which is permanently secured to said boss.

At its outer extremity each spoke is provided with a coupling end 19 which is pivotally mounted on a pivot bolt 20 inserted through the annular angle irons 7 thus forming a jointed connection between the outer end of each spoke and the rim or felly. The outer coupling end is provided with a flange 21 lying adjacent to the inner edges of the annular angle irons 7 and within said flange the coupling end is formed with a boss 22 around which is fastened the adjacent end of the casing 11. Within the tubular casings of each spoke is mounted a helical cushioning spring 23 which is fixedly connected at its opposite extremities to the bosses 18 and 22 by means of L-shaped spring holders 24, each holder comprising a projecting tongue or lip 25 under which the terminal convolution of each spoke is held as clearly shown in the drawings thus preventing any disconnection between either end of the spoke and the boss 18 or 22 as the case may be. Filler blocks 26 are inserted and held between the angle irons 7 by means of bolts or rivets 27 and terminate a sufficient distance apart to leave spaces 28 to admit of the rocking of the outer coupling ends of the spokes. To prevent mud and other foreign matter from entering said spaces 28 I provide outer mud guards 29 in the form of plates adapted to fit against and ride upon the inner edges of the angle irons 7, each of said mud guards being provided with a central opening 30 for the respective coupling end. Each mud guard is further provided with the side flanges 31 suitably spaced apart to embrace and ride against the outer faces of the angle irons 7, the flanges 31 being notched at 32 to avoid the heads and nuts of the pivot bolts 20. As the spokes work back and forth on their pivotal connections with the hub and rim or felly, the mud guards 29 slide correspondingly but always cover the spaces 28 and thereby exclude foreign matter. Other mud guards 33 cover the spaces 34 between the inner coupling ends where they fasten to the hub extension. Each of these mud guards 33 is provided with inwardly extending ears 35 through which is inserted a pivot bolt 36 which also passes through the flanges 4 of the hub extension. The mud guard 33 is also formed in its opposite edges with notches 37 to partially embrace the inner portions of the spoke casings and to ride upon the projecting lips 17 above referred to as the spokes work on their pivotal connections with the hub and felly. In the operation of the wheel, the cushioning springs 23 operate to absorb all ordinary road shocks and they all mutually assist each other in supporting the load placed upon the wheel as a whole. The mud guards not only exclude foreign matter from the spaces in which the coupling ends of the spokes work but they also act as yielding reinforcements or friction elements in that, to a certain extent, they resist the pivotal action of the spokes relatively to the hub and rim. This results in an exceedingly strong construction of wheel while providing for the necessary resiliency or spring action necessary to absorb shocks and vibrations when the vehicle is traveling over a rough road surface.

What I claim is:—

A spring wheel comprising in combination a hub, a cylindrical hub extension formed with an annular channel in its periphery, a rim, annular angle irons on the inner face of said rim in spaced relation to each other, and spokes each embodying two tubular telescopic casings, coupling ends at the opposite extremities of each spoke pivotally held in said channel of the hub and between the annular angle irons of the rim, oscillatory mud guards pivotally attached to said hub extension and interposed between the spokes adjacent to said hub extension, filler sections between said annular angle irons, and mud guards embracing the outer end portions of the spokes and slidable upon said angle irons and filler sections, the inner end coupling of each spoke being extended at opposite sides to form shoes which ride against said hub extension.

In testimony whereof I affix my signature in presence of two witnesses.

LEWIS E. TICHENOR.

Witnesses:
RUBY L. COOK,
CHARLES E. WISNER.

Copies of this patent may be obtained for five cents each, by addressing the "Commissioner of Patents, Washington, D. C."